US005302441A

United States Patent [19]

Canary

[11] Patent Number: 5,302,441

[45] Date of Patent: Apr. 12, 1994

[54] POSTFORMABLE DECORATIVE LAMINATING PAPER

[75] Inventor: Stephen A. Canary, Westfield, Mass.

[73] Assignee: The Mead Corporation, Dayton, Ohio

[21] Appl. No.: 792,807

[22] Filed: Nov. 15, 1991

[51] Int. Cl.[5] .............. B32B 9/00

[52] U.S. Cl. .............. 428/211; 428/153; 428/202; 428/206; 428/207; 428/325; 428/328; 428/330; 428/913.3

[58] Field of Search .............. 428/913.3, 153, 202, 428/325, 328, 206, 207, 211, 330, 195

[56] References Cited

U.S. PATENT DOCUMENTS

| | | | |
|---|---|---|---|
| 4,044,185 | 8/1977 | McCaskey, Jr. et al. | 428/153 |
| 4,315,967 | 2/1982 | Prior et al. | 428/285 |
| 4,472,474 | 9/1984 | Grosheim et al. | 428/195 |

FOREIGN PATENT DOCUMENTS

| | | |
|---|---|---|
| 0003481 | 8/1979 | European Pat. Off. . |
| 59-071333 | of 0000 | Japan . |
| 818652 | 1/1960 | United Kingdom . |
| 2225794 | 6/1990 | United Kingdom . |
| 2255981 | 11/1992 | United Kingdom . |

OTHER PUBLICATIONS

European Search Report (Jul. 30, 1993).

*Primary Examiner*—P. J. Ryan
*Assistant Examiner*—Abraham Bahta
*Attorney, Agent, or Firm*—Thompson, Hine and Flory

[57] ABSTRACT

A decor sheet for use in a decorative laminate includes cellulosic fibers, a sulfur dye, and a water insoluble precipitate of a basic salt.

10 Claims, No Drawings

POSTFORMABLE DECORATIVE LAMINATING PAPER

BACKGROUND OF THE INVENTION

The present invention relates to a decor sheet for a decorative laminate.

Decorative laminates are well known in the art. They are typically formed from a book of core sheets of kraft paper generally brown in color and impregnated with a phenolic resin and at least one resin-impregnated decor sheet which is pigmented or colored and disposed on at least one face of the book of core sheets. A resin-impregnated overlay may also be superimposed on the decor sheet for scratch resistance. These sheets are consolidated under heat and pressure into a laminate useful in covering walls, furniture, countertops, and the like.

In the past, decor sheets have been colored using a class of dyes known as sulfur dyes. Decor sheets colored with sulfur dyes have suffered from the drawback that the sulfur dye appears to accelerate the rate of cure of the resin to such an extent that the resin becomes highly crosslinked, brittle and exhibits poor postformability.

DEFINITIONS

The term "water soluble" as used with respect to salts herein means that the salt is soluble in water in the amounts disclosed herein. For example, in the case of magnesium sulfate, the salt is sufficiently soluble in water to be added to the furnish for the decor sheet in an amount of 20–85% based on oven dry pulp.

The term "water insoluble" when used with respect to the precipitated salt herein means that the solubility of the precipitated salt in water is sufficiently low that at least a majority of the salt precipitates from solution under the conditions taught herein.

SUMMARY OF THE INVENTION

In accordance with the present invention, a decor sheet is provided which is colored by a sulfur dye and yields good postformability. In accordance with the invention, certain water insoluble basic salts and, more particularly, alkaline earth metal hydroxides are introduced to the papermaking furnish for the decor sheet. While not desiring to be bound, these salts appear to precipitate onto the fibers in the furnish and to neutralize acidic groups in the sulfur dyes and thereby prevent the dyes from catalyzing curing of the resin.

Accordingly, one aspect of the invention is a decor sheet for a decorative laminate wherein the sheet comprises cellulosic fibers, a precipitate of a water insoluble basic salt, and a sulfur dye.

Another aspect of this invention is a process for making a decor sheet for use in decorative laminates which comprises adding a sulfur dye, and first and second water soluble salts to a papermaking furnish for said decor sheet, said first and second salts interacting to form a water insoluble basic salt which precipitates within said furnish, and forming a decor sheet from said furnish. In a preferred aspect of the invention, the precipitated salt is an alkaline earth metal hydroxide formed by interaction of a water soluble alkaline earth metal salt and sodium hydroxide.

Still another aspect of the invention is a decorative laminate which includes the decor sheet described above.

DETAILED DESCRIPTION OF THE INVENTION

The furnish for the decor sheet of the invention can be prepared from any cellulosic pulp including hardwood, softwood or mixtures of hardwood and softwood pulps. The pulp may be a chemical pulp such as a kraft pulp or a sulfite pulp, a chemimechanical pulp or a mechanical pulp. Alpha-cellulose such as cotton linter may be added to the furnish to further enhance postformability in a known manner.

Additives such as wet strength resins, retention aids, pH stabilizers, salting out agents, and alum may be used in a known manner to control end use characteristics.

In accordance with the invention, a combination of water soluble salts is added to the furnish which interact by ion exchange to precipitate a water insoluble basic salt in the furnish. In one embodiment of the invention, an alkaline earth metal salt such as magnesium sulfate is reacted with sodium hydroxide to precipitate magnesium hydroxide in the furnish.

An alkaline earth metal salt such as an alkaline earth metal sulfate or chloride (e.g., magnesium sulfate or magnesium chloride) is added to the furnish in an amount of about 20 to 85% by weight, all percents by weight herein are based on the oven dry weight of pulp in the furnish. It is anticipated that the amount of the alkaline earth metal salt will typically range from about 20 to 50% by weight. The amount of precipitated salt such as $Mg(OH)_2$ in the furnish is typically about 5 to 20% and more typically 5 to 12%.

To precipitate the basic salt in the furnish, a salt such as sodium hydroxide is added to the furnish. Preferably, this salt is added in an amount in excess of the stoichiometric amount required to precipitate the basic salt in the furnish. Sodium hydroxide is the water soluble base of choice and is generally added to the furnish in an amount of about 5 to 40% and preferably 15 to 25% by weight based upon the oven dry weight of the pulp in the furnish.

Sulfur dyes are well known in the art and commercially available. Some typical examples include C.I. Leuco Sulfur Black 1 Dye. The following dyes which are commercially available from Sandoz Corporation are useful herein: Sodyesul Black 4GCF, Sodyesul Black PLCF, Sodyesul Black 2RCF, Sodyesul Red 2B, and Hoechst Duasyn Thioblack SR, Duasyn Thiocarbon LP (C.I. Sulfur Black 1), etc.

The sulfur dye is preferably added to the furnish in its water soluble leuco form. The dye is typically added in an amount of about 10–30% based upon oven dry pulp. The amount will vary depending upon the decorative effect which is desired. Dyes added for tinting may be used in much lower amounts. To convert the dye from its soluble leuco form to its insoluble form and deposit the dye onto the cellulosic fibers, an agent such as ferrous sulfate is used in a manner well known in the art. As is known, sulfur dyes are often supplied commercially in the leuco form in the presence of sodium sulfide which maintains them in that form. The ferrous sulfate interacts with the sulfide and causes the leuco dye to convert to its oxidized form. The sulfur dye can also be added in its oxidized form, converted to its leuco form by the addition of a reducing agent and reconverted to the oxidized form to deposit it on the fibers.

Because there is a tendency for sulfur dyes to oxidize over time and generate acidic groups which can degrade the paper, a pH stabilizer such as calcium carbonate may be added to the furnish in a known manner.

Any conventional laminating resin may be used with the decor sheet of the present invention to form decorative laminates in accordance with the invention. The laminating conditions including the selection of the resin, the amount of the resin, the temperature and pressure under which the laminate is consolidated are all known in the art.

While the decor sheet of the invention is normally incorporated into a laminate such that it overlays the core sheets, the decor sheet of the invention can be used at any location in the laminate in which its decorative effect is desired.

For optimum postformability, it is desirable to produce a decor sheet which exhibits a disc cure time, as defined in the following examples, of about 7 to 10 minutes.

The invention is illustrated in more detail by the following non-limiting examples:

EXAMPLE 1

To a slurry of bleached hardwood kraft, bleached softwood sulfite, and second cut cotton linters at 4% consistency in water, 2% sodium carbonate, 4% calcium carbonate, 20% C.I. Leuco Sulfur Black 1 dye, 12% ferrous sulfate heptahydrate, 50% magnesium sulfate heptahydrate, 20% sodium hydroxide and 1% polyamide epichlorohydrin wet strength resin were added based upon pulp weight. This furnish was then diluted to 0.5% with water, adjusted to pH 10.0 with papermakers alum and formed into a fibrous mat by draining the suspension through a wire screen. The fibrous mat was then removed from the screen, placed between felts, pressed between steel rollers at 20 psi, and dried against a heated metal surface.

The paper thus produced was evaluated for its catalytic activity toward the crosslinking reaction of melamine formaldehyde resin as follows: Discs of 1.625 inch diameter are die cut from the paper and weighed to the nearest milligram. The discs are individually placed with the wire side down between a 6 inch by 12 inch by 0.0015 inch thick piece of foil which has been folded in half lengthwise polished side in. Powdered melamine formaldehyde resin of equal weight to the paper disc is spread evenly over the felt side of the disc using a spatula. This "sandwich" is then placed into a preheated (291° F.+0.5°) platen press. A pressure of 1000 psi is applied for a preset time and then released. The "sandwich" is then removed from the press and placed between two metal blocks to rapidly cool the disc. The disc is then removed from the foil and placed into a boiling solution of 0.1% Rhodamine B dye in distilled water for 3 minutes. The disc is removed from the solution, blotted and allowed to air dry. Examination of the disc surface will indicate the state of cure of the resin. A distinct reddish color is indicative of resin undercure, whereas a fully cured disc is not discolored by the Rhodamine dye. This test is repeated at incremental pressing times to determine the time at which full resin cure is achieved. This time is designated as the disc cure time. The disc cure time for this example was found to be eight minutes.

EXAMPLE 2

To a slurry of bleached hardwood kraft, bleached softwood sulfite, and second cut cotton linters at 4% consistency in water, 2% sodium carbonate, 4% calcium carbonate, 20% C.I. Leuco Sulfur Black 1 Dye, 12% ferrous sulfate heptahydrate, 85% magnesium sulfate heptahydrate, 20% sodium hydroxide and 1% melamine formaldehyde wet strength resin were added based upon pulp weight. This furnish was then diluted to 0.5% with water, adjusted to pH 8.0 with papermakers alum and formed into a fibrous mat by draining the suspension through a wire screen. The fibrous mat was then removed from the screen, placed between linter blotters, pressed between steel rollers at 20 psi, and dried against a heated metal surface. Disc cure time, six minutes.

EXAMPLE 3

To a slurry of bleached hardwood kraft, bleached softwood sulfite, and second cut cotton linters at 4% consistency in water, 2% sodium carbonate, 4% calcium carbonate, 20% C.I. Leuco Sulfur Black 1 Dye, 12% ferrous sulfate heptahydrate, 85% magnesium sulfate heptahydrate, 15% sodium hydroxide and 1% melamine formaldehyde wet strength resin were added based upon pulp weight. This furnish was then diluted to 0.5% with water, adjusted to pH 8.0 with papermakers alum and formed into a fibrous mat by draining the suspension through a wire screen. The fibrous mat was then removed from the screen, placed between linter blotters, pressed between steel rollers at 20 psi, and dried against a heated metal surface. Disc cure time, five minutes.

COMPARATIVE EXAMPLE 1

To a slurry of bleached hardwood kraft, bleached softwood sulfite, and second cut cotton linters at 4% consistency in water, 2% sodium carbonate, 4% calcium carbonate, 20% C.I. Leuco Sulfur Black 1 Dye, 12% ferrous sulfate heptahydrate, 15% sodium hydroxide and 1% melamine formaldehyde wet strength resin were added based upon pulp weight. This furnish was then diluted to 0.5% with water, adjusted to pH 8.0 with papermakers alum and formed into a fibrous mat by draining the suspension through a wire screen. The fibrous mat was then removed from the screen, placed between linter blotters, pressed between steel rollers at 20 psi and dried against a heated metal surface. Disc cure time, three minutes.

COMPARATIVE EXAMPLE 2

To a slurry of bleached hardwood kraft, bleached softwood sulfite, and second cut cotton linters at 4% consistency in water, 2% sodium carbonate, 4% calcium carbonate, 20% C.I. Leuco Sulfur Black 1 Dye, 12% ferrous sulfate heptahydrate, 20% magnesium hydroxide, 15% sodium hydroxide and 1% melamine formaldehyde wet strength resin were added based upon pulp weight. This furnish was then diluted to 0.5% with water, adjusted to pH 8.0 with papermakers alum and formed into a fibrous mat by draining the suspension through a wire screen. The fibrous mat was then removed from the screen, placed between linter blotters, pressed between steel roller at 20 psi, and dried against a heated metal surface. Disc cure time, two minutes, thirty seconds.

Having described the invention in detail and by reference to preferred embodiments thereof, it will be apparent that modifications and variations are possible without departing from the scope of the invention defined in the appended claims.

What is claimed is:

1. A decor sheet for use in a decorative laminate, said sheet including cellulosic fibers, a sulfur dye, and about 5 to 20% by weight of a water insoluble precipitate of a basic salt, wherein said precipitate is formed by interaction of a first water soluble salt and a second water soluble salt.

2. The decor sheet of claim 1 wherein said water insoluble precipitate of a basic salt is an alkaline earth metal hydroxide.

3. The decor sheet of claim 2 wherein said alkaline earth metal hydroxide is magnesium hydroxide.

4. The decor sheet of claim 1 wherein said second water soluble salt is sodium hydroxide.

5. The decor sheet of claim 1 wherein said first water soluble salt is an alkaline earth metal sulfate or chloride.

6. The decor sheet of claim 7 wherein said first salt is magnesium sulfate or magnesium chloride.

7. A decorative laminate including the decor sheet of claim 1.

8. The decor sheet of claim 1 wherein said sulfur dye is present in said decor sheet in an amount ranging from about 10 to 30% by weight.

9. The decor sheet of claim 1 wherein said precipitate is formed by interaction of about 20 to 85% by weight of a first water soluble salt and about 5 to 40% by weight of a second water soluble salt.

10. A decor sheet for use in a decorative laminate, wherein said decor sheet includes cellulosic fibers, about 10 to 30% by weight of a sulfur dye, and about 5 to 20% by weight magnesium hydroxide, said magnesium hydroxide being formed by the interaction of about 20 to 85% by weight magnesium sulfate and about 5 to 40% by weight sodium hydroxide.

* * * * *